(12) United States Patent
Jiang et al.

(10) Patent No.: US 10,394,078 B2
(45) Date of Patent: Aug. 27, 2019

(54) COLOR FILM SUBSTRATE, ARRAY SUBSTRATE, DISPLAY DEVICE, AND METHOD FOR CONTROLLING THE DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Liangliang Jiang, Beijing (CN); Lei Guo, Beijing (CN); Ke Dai, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/755,944

(22) PCT Filed: Aug. 21, 2017

(86) PCT No.: PCT/CN2017/098261
§ 371 (c)(1),
(2) Date: Feb. 27, 2018

(87) PCT Pub. No.: WO2018/126699
PCT Pub. Date: Jul. 12, 2018

(65) Prior Publication Data
US 2018/0335664 A1     Nov. 22, 2018

(30) Foreign Application Priority Data

Jan. 3, 2017  (CN) .......................... 2017 1 0001451

(51) Int. Cl.
*G02F 1/1335*  (2006.01)
*G02F 1/1362*  (2006.01)
*G02F 1/1368*  (2006.01)

(52) U.S. Cl.
CPC ...... *G02F 1/133621* (2013.01); *G02F 1/1368* (2013.01); *G02F 1/133514* (2013.01);
(Continued)

(58) Field of Classification Search
CPC ......... G02F 1/133514; G02F 1/133621; G02F 1/133609; G02F 1/133617; G02F 1/1368;
(Continued)

(56) References Cited

U.S. PATENT DOCUMENTS

2011/0007047 A1 *  1/2011  Fujioka ............... G02F 1/13338
  345/207
2012/0320270 A1   12/2012  Takata
(Continued)

FOREIGN PATENT DOCUMENTS

CN   101424821 A    5/2009
CN   102779495 A    11/2012
(Continued)

OTHER PUBLICATIONS

Author:Jiayue Sun, Bing Xue, Guangchao Sun, Dianpeng Cui, Titile: Yellow upconversion luminescence in Ho3+/Yb3+ co-doped Gd2Mo3O9 phosphor, Publisher: Journal of Rare Earths, vol. 31, No. 8, Aug. 2013, p. 741 (Year: 2013).*
(Continued)

*Primary Examiner* — Shan Liu
(74) *Attorney, Agent, or Firm* — Harness, Dickey & Pierce, P.L.C.

(57) ABSTRACT

Embodiments of the disclosure relate to a color film substrate, an array substrate, a display device, and a method for controlling the display device. The color film substrate
(Continued)

comprises a substrate; and a red block, a green block, a blue block and a white block on the substrate, wherein the white block is provided with light-emitting particles dispersed therein or on the surface thereof, and the light-emitting particles are capable of emitting yellow light upon the excitation of incident light.

14 Claims, 4 Drawing Sheets

(52) U.S. Cl.
CPC .. *G02F 1/133609* (2013.01); *G02F 1/133617* (2013.01); *G02F 2001/133614* (2013.01); *G02F 2001/133624* (2013.01); *G02F 2001/133626* (2013.01); *G02F 2001/136222* (2013.01); *G02F 2203/11* (2013.01)

(58) Field of Classification Search
CPC ..... G02F 2203/11; G02F 2001/133624; G02F 2001/136222; G02F 2001/133626; G02F 2001/133614; G02F 1/133603; G02F 2201/44; G02F 1/133512; G02F 1/136209; G02F 1/13473; G02F 1/133371; G02F 2001/136218; H01J 11/44; H01J 2211/444; H01J 2329/323; H01J 29/327
USPC ...................................... 349/69–71, 106–111
See application file for complete search history.

(56) References Cited

U.S. PATENT DOCUMENTS

| | | | | |
|---|---|---|---|---|
| 2013/0300771 | A1* | 11/2013 | Cho | ........................ G09G 5/026 345/690 |
| 2015/0077973 | A1 | 3/2015 | Hagemann et al. | |
| 2015/0301402 | A1* | 10/2015 | Kimura | ............. G02F 1/133512 349/69 |
| 2015/0301408 | A1* | 10/2015 | Li | ...................... G02F 1/133621 362/84 |
| 2016/0023242 | A1 | 1/2016 | Kundaliya et al. | |
| 2016/0349429 | A1* | 12/2016 | Song | ........................ G02B 6/005 |
| 2017/0097540 | A1* | 4/2017 | Kim | .................. G02F 1/133509 |
| 2017/0115562 | A1* | 4/2017 | Kim | ....................... G03F 7/0007 |

FOREIGN PATENT DOCUMENTS

| | | |
|---|---|---|
| CN | 102812395 A | 12/2012 |
| CN | 105467670 A | 4/2016 |
| CN | 106483708 A | 3/2017 |

OTHER PUBLICATIONS

International Search Report from corresponding PCT Application No. PCT/CN2017/098261 (5 pages).
Written Opinion from corresponding PCT Application No. PCT/CN2017/098261 dated Nov. 9, 2017 (4 pages).

* cited by examiner

COLOR FILM SUBSTRATE, ARRAY SUBSTRATE, DISPLAY DEVICE, AND METHOD FOR CONTROLLING THE DISPLAY DEVICE

CROSS-REFERENCES TO RELATED APPLICATIONS

This application claims priority and benefits of Chinese Patent Application No. 201710001451.0, filed on Jan. 3, 2017, the entire content of which is incorporated by reference herein.

FIELD OF THE DISCLOSURE

Embodiments of the present disclosure relate to the field of liquid crystal display technologies, and in particular, to a color film substrate, an array substrate, a display device, and a method for controlling the display device.

BACKGROUND

Currently, a liquid crystal display device is one of widely used display devices. FIG. 1 schematically shows a cross-sectional view of a conventional liquid crystal display device. As shown in FIG. 1, the basic structure of a liquid crystal display device is such that a liquid crystal cell 13 is placed between two parallel glass substrates (11, 12), a thin film transistor (TFT) 121 is positioned on the lower glass substrate 12 (also referred to as an array substrate), color blocks (including red (R), green (G) and blue (B)) are positioned on the upper glass substrate 11 (also referred to as a color film substrate), and a backlight unit 14 is positioned under the lower glass substrate 12. White light 141 emitted by the backlight unit sequentially passes through the lower glass substrate 12, the liquid crystal layer 13 and the upper glass substrate 11, thereby presenting a full color display and a grayscale luminance.

BRIEF SUMMARY OF THE DISCLOSURE

Provided in the embodiments of the present disclosure are a color film substrate, an array substrate, a display device and a method for controlling the display device.

In a first aspect of the present disclosure, there is provided a color film substrate. The color film substrate may comprise a substrate; and a red block, a green block, a blue block and a white block on the substrate, wherein the white block is provided with light-emitting particles dispersed therein or on the surface thereof, the light-emitting particles being capable of emitting yellow light upon the excitation of incident light.

In an embodiment, the light-emitting particles may comprise holmium ytterbium co-doped $Gd_2Mo_3O_9$ phosphor particles. A wavelength of the incident light may range from about 900 nm to about 1100 nm.

In an embodiment, the wavelength of the incident light may be about 980 nm.

In an embodiment, the white block may comprise about 5-8% by weight of a resin; about 5-8% by weight of a multifunctional monomer; about 0.2-0.6% by weight of a photoinitiator; about 3-5% by weight of a dispersant; about 70-80% by weight of a solvent; and about 0.1-0.2% by weight of an additive. An proportion of the light-emitting particles in the white block may be about 5-20% by weight.

In a second aspect of the present disclosure, there is provided a display device. The display device may comprise any one of color film substrates described in the first aspect of the present disclosure; an array substrate positioned opposite to the color film substrate; a liquid crystal layer positioned between the color film substrate and the array substrate; and a first backlight unit and a second backlight unit positioned on a side of the array substrate far away from the liquid crystal layer, wherein the first backlight unit may be configured to emit white light; and the second backlight unit may be configured to emitt the incident light that excites the light-emitting particles to emit yellow light.

In an embodiment, the display device may further comprise a control unit connected to the first backlight unit and the second backlight unit, the control unit being configured to control the display device to switch between a first operation mode and a second operation mode, wherein in the first operation mode, the control unit may control both the first backlight unit and the second backlight unit to be turned on; in the second operation mode, the control unit may control the first backlight unit to be turned on and control the second backlight unit to be turned off.

In an embodiment, the light-emitting particles may comprise holmium ytterbium co-doped $Gd_2Mo_3O_9$ phosphor particles, and the second backlight unit may comprise a laser LED capable of emitting light in a wavelength range of about 900 nm to about 1100 nm.

In an embodiment, the first backlight unit may comprise a blue LED and yttrium aluminum garnet (YAG) powder coated on the blue LED.

In a third aspect of the present disclosure, there is further provided an array substrate. The array substrate may comprise a substrate; thin film transistors on the substrate arranged in an array; and a red block, a green block, a blue block and a white block on the substrate, wherein the white block is provided with light-emitting particles dispersed therein or on the surface thereof, the light-emitting particles being capable of emitting yellow light upon the excitation of the incident light.

In an embodiment, the light-emitting particles may comprise holmium ytterbium co-doped $Gd_2Mo_3O_9$ phosphor particles. A wavelength of the incident light may range from about 900 nm to about 1100 nm.

In an embodiment, the wavelength of the incident light may be about 980 nm.

In an embodiment, the white block may comprise about 5-8% by weight of a resin; about 5-8% by weight of a multifunctional monomer; about 0.2-0.6% by weight of a photoinitiator; about 3-5% by weight of a dispersant; about 70-80% by weight of a solvent; and about 0.1-0.2% by weight of an additive. An proportion of the light-emitting particles in the white block may be about 5-20% by weight.

In a fourth aspect of the present disclosure, there is provided a display device. The display device may comprise any one of array substrates described in the third aspect of the present disclosure; an opposite substrate positioned opposite to the array substrate; a liquid crystal layer positioned between the opposite substrate and the array substrate; and a first backlight unit and a second backlight unit positioned on a side of the array substrate far away from the liquid crystal layer, wherein the first backlight unit may be configured to emit white light; and the second backlight unit may be configured to emit the incident light that excites the light-emitting particles to emit yellow light.

In an embodiment, the display device may further comprise a control unit connected to the first backlight unit and the second backlight unit, the control unit being configured to control the display device to switch between a first operation mode and a second operation mode, wherein in the first operation mode, the control unit may control both the first backlight unit and the second backlight unit to be turned on; in the second operation mode, the control unit may control the first backlight unit to be turned on and control the second backlight unit to be turned off.

In an embodiment, the light-emitting particles may comprise holmium ytterbium co-doped $Gd_2Mo_3O_9$ phosphor particles, and the second backlight unit may comprise a laser LED capable of emitting light in a wavelength range of about 900 nm to about 1100 nm.

In an embodiment, the first backlight unit may comprise a blue LED and YAG powder coated on the blue LED.

In a fifth aspect of the present disclosure, there is provided a method for controlling the display device described in any one of the display devices in the second and fourth aspect of the present disclosure. The method comprises controlling the display device to switch between a first operation mode and a second operation mode, wherein in the first operation mode, both the first backlight unit and the second backlight unit are turned on; in the second operation mode, the first backlight unit is turned on and the second backlight unit is turned off.

Further adaptive aspects and scope become apparent from the description provided herein. It should be understood that various aspects of the application may be implemented alone or in combination with one or more other aspects. It is also to be understood that the description and specific embodiments herein are intended for purposes of illustration only and are not intended to limit the scope of the application.

BRIEF DESCRIPTION OF THE DRAWINGS

The drawings described herein are for purposes of illustration of the selected embodiments only, rather than all possible embodiments, and are not intended to limit the scope of the application, wherein.

Corresponding reference numerals indicate corresponding parts or features throughout the several views of the drawings.

DETAILED DESCRIPTION

Figure 1:
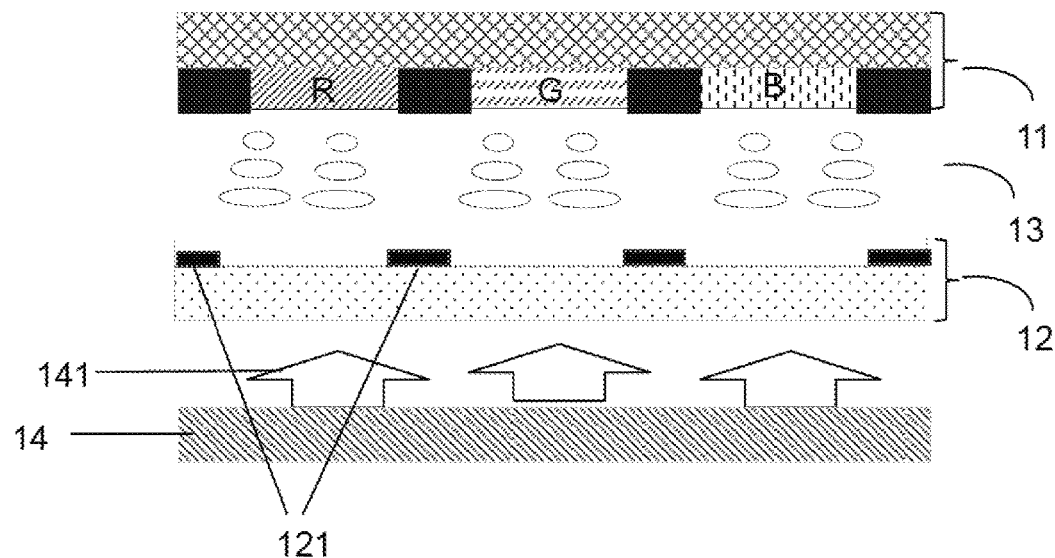
FIG. 1 schematically shows a cross-sectional view of a conventional liquid crystal display device.

It should be noted that as used herein and in the appended claims, the singular form of a word includes the plural, and vice versa, unless the context clearly dictates otherwise. Thus, when a singular form is referred to, it is generally inclusive of the plurals of the respective terms. Similarly, the words "comprise", "include" are to be interpreted inclusively rather than exclusively, unless such a construction is clearly prohibited from the context. Where used herein the term "examples" particularly when followed by a listing of terms is merely exemplary and illustrative, and should not be deemed to be exclusive or comprehensive.

In addition, the thickness and region of each layer in the drawings are exaggerated for clarity. It should be understood that when a layer, a region, or a component is referred to as being "on" another part, it means that it is directly on the other part, or there may be another component therebetween. In contrast, when a component is referred to as being "directly" on another component, it means that there is no other component therebetween.

Example embodiments will now be more fully described with reference to the accompanying drawings.

Figure 2:
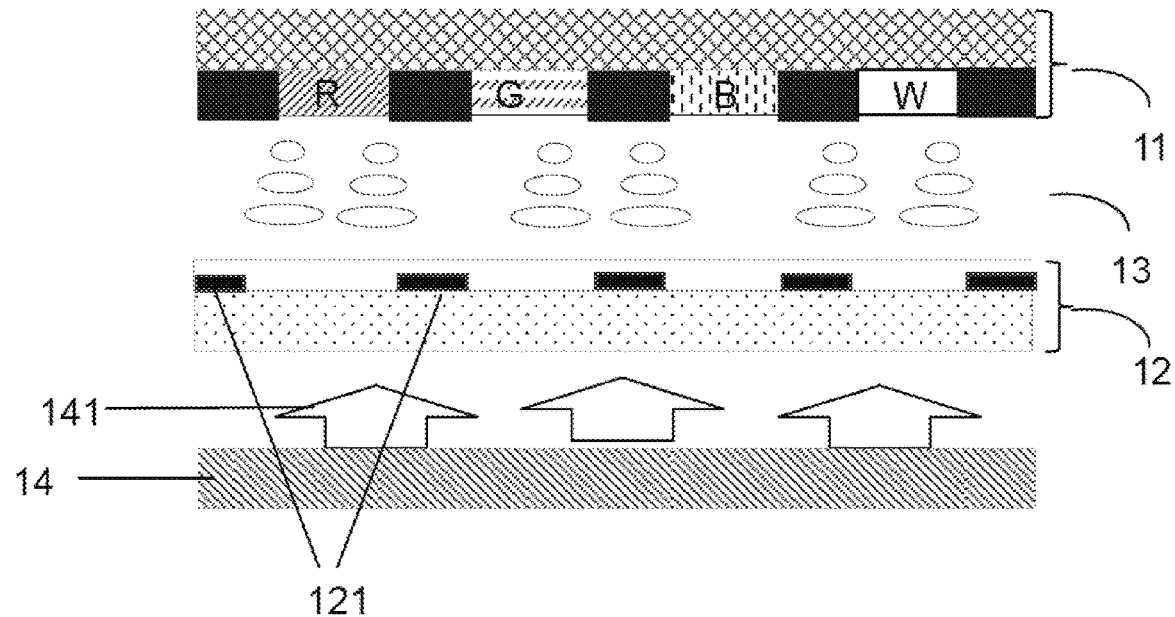
FIG. 2 schematically shows a cross-sectional view of an RGBW display device.
Figure 3:
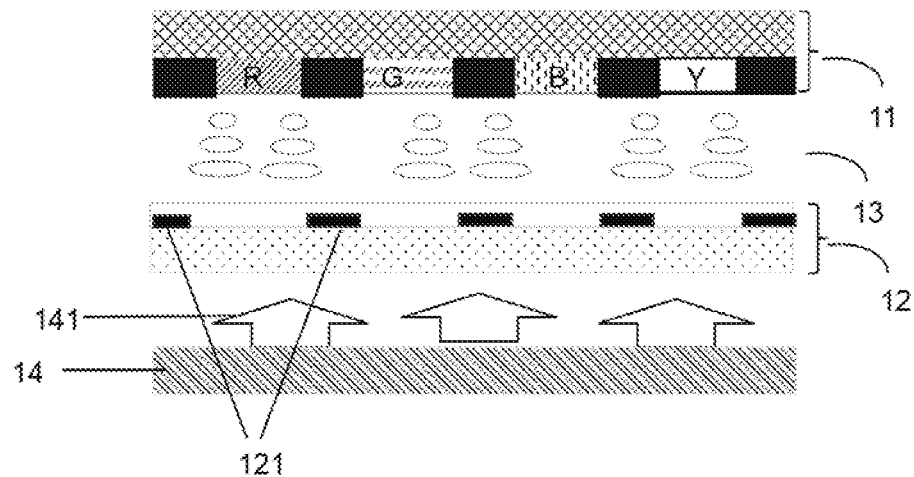
FIG. 3 schematically shows a cross-sectional view of an RGBY display device.

FIGS. 2 and 3 schematically show cross-sectional views of a red-green-blue-white (RGBW) display device and a red-green-blue-yellow (RGBY) display device, respectively. As shown in FIG. 2, the RGBW display device is a device with the addition of white pixels W to a RGB display device. The added white pixels may improve light transmittance. Given the same display luminance, such display device may reduce the overall power consumption of the display device. As shown in FIG. 3, the RGBY display device is a device with the addition of yellow pixels Y to the RGB display device. The added yellow pixels may improve the color gamut range of the display device, thereby enhancing the color rendering capability of the display device.

In a liquid crystal display device including three-primary-color RGB pixel display units, RGB blocks for the respective RGB pixels allow only light with the corresponding color to pass through and block light with the other colors, thereby leading to relatively low light transmittance (typically no higher than about 33.3%), and affecting the overall light efficiency. In addition, in the RGB liquid crystal display device, the three-primary-color RGB display has a limited color gamut, especially in the case that yellow and gold colors are displayed, the display picture is rough and cannot present delicate color beauty.

As already mentioned above, the RGBW display device may improve light transmittance and reduce power consumption, but, like the RGB display device, it is difficult to use in application situations requiring a wide color gamut and good color rendering. On the contrary, the RGBY display device may improve the color gamut range and the color rendering capability of the display device. However, the added yellow pixels also allow only the light with one color (yellow light) to pass through and block the light with the other colors, likewise leading to low transmittance, not suitable for use in situations requiring high transmittance and low power consumption.

In the embodiments described herein, there is provided a color film substrate which may be applied to a display device, such that the display device has both high transmittance and a wide color gamut range, and thus may be applied in both situations requiring high transmittance and low power consumption and situations requiring good color rendering.

An exemplary color film substrate provided by the embodiments of the disclosure will now be described in detail with reference to FIG. 4.

Figure 4:
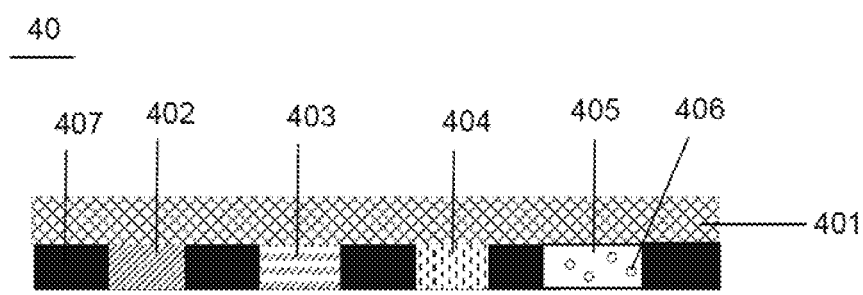
FIG. 4 schematically shows a cross-sectional view of an exemplary color film substrate provided in an embodiment of the disclosure.

FIG. 4 schematically shows a cross-sectional view of an exemplary color film substrate 40 according to an embodiment of the disclosure. As shown in FIG. 4, the color film substrate 40 may comprise a substrate 401 and a red block 402, a green block 403, a blue block 404 and a white block 405 on the substrate 401. In this embodiment, the white block 405 comprises light-emitting particles 406 dispersed therein or on the surface thereof, the light-emitting particles 406 being capable of emitting yellow light upon the excitation of incident light.

In this embodiment, the white block 405 may allow white light to pass through; the red block 402 may allow the red light component in white light to pass through and block the light with the other colors; the green block 403 may allow the green light component in white light to pass through and block the light with the other colors. The blue block 404 may allow the blue light component in white light to pass through and block the light with the other colors.

It should be noted that the color film substrate may further comprise, in addition to the foregoing components, components conventionally required in operation, such as a black matrix 407 formed on the substrate in a matrix arrangement and defining pixel regions, and a conductive layer (used as a common electrode) formed of a transparent material such as indium tin oxide (ITO) or indium zinc oxide (IZO). In the embodiments of the disclosure, these components are not described in detail herein. However, this does not mean that the color film substrate described herein does not have these components.

In the embodiment, the white block having light-emitting particles therein/thereon is added in addition to RGB block so that on the one hand, white light may pass through the white block to achieve an RGBW display and on the other hand, the light-emitting particles may emit yellow light upon the excitation of the incident light to achieve an RGBY display. Therefore, in the case where the color film substrate provided in the embodiments of the disclosure is applied to the display device, both the RGBW display with high transmittance and low power consumption and the RGBY display with a wide color gamut range and good color rendering may be simultaneously realized under the cooperation of a backlight unit emitting white light and a backlight unit emitting the incident light. That is, both the display color and display luminance of the display device may be improved.

In an exemplary embodiment, the light-emitting particles may be up-converting light-emitting particles, for example, holmium ytterbium co-doped $Gd_2Mo_3O_9$ phosphor particles. The incident light described above may have a wavelength ranging from about 900 nm to about 1100 nm. In other word, the incident light may comprise near-infrared light having a wavelength ranging from about 900 nm to about 1100 nm. Alternatively, it may be near-infrared light at a wavelength of about 980 nm.

Up-converting phosphor technology (UPT) is a technology in which up-converting particles (UCP) is used as a fluorescent material (such as rare earth ions) to emit high energy light at a short wavelength (such as visible light) by absorbing low energy light at a long wavelength (such as infrared light), so as to achieve energy conversion. The up-converting light-emitting particles such as holmium ytterbium co-doped $Gd_2Mo_3O_9$ phosphor particles may emit yellow light upon the excitation of light in a near-infrared wavelength range of about 900 nm to about 1100 nm, particularly light of about 980 nm. Therefore, in this embodiment, the RGBY display may be realized on the basis of the RGBW display by doping, for example, holmium ytterbium co-doped $Gd_2Mo_3O_9$ phosphor particles in a white block. In the case that the color film substrate is applied to a display device, not only the transmittance of the display device may be improved, but also the color gamut range of the display device and the color rendering capability may be improved.

It is to be understood that the light-emitting particles and the corresponding wavelength of the excitation light are not limited to those exemplarily described herein, and any kind of light-emitting particles capable of emitting yellow light upon the excitation of the excitation light at a certain wavelength and the corresponding wavelength of excitation light are within the scope of the disclosure.

In an example, the substrate may be made of a transparent material such as glass. The white block 45 may comprise a resin, optionally, an acrylic material, a polyfunctional monomer, a photoinitiator, a dispersant, a solvent, and an additive. In a particular embodiment, the white block may comprise about 5-8% by weight of a resin; about 5-8% by weight of a multifunctional monomer; about 0.2-0.6% by weight of a photoinitiator; about 3-5% by weight of a dispersant; about 70-80% by weight of a solvent; and about 0.1-0.2% by weight of an additive. The material forming the red block 42, the green block 43, and the blue block 44 may further comprise, in addition to the same material as the material forming the white block, a dye with a corresponding color (R/G/B), and more specifically, a proportion of the dye may be about 5-8% by weight. In addition, in this embodiment, the proportion of the light-emitting particles in the white block may be about 5-20% by weight, so that the light-emitting particles may be excited to emit yellow light having sufficient intensity without affecting the light emission intensity of the white light from the white block.

Figure 5A:
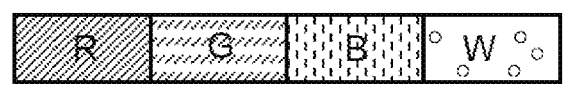
FIGS. 5A-5C schematically show exemplary arrangements of a red block R, a green block G, a blue block B and a white block W.
Figure 5B:
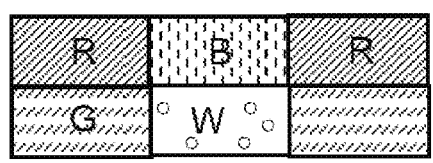
Figure 5C:

FIGS. 5A-5C schematically show exemplary arrangements of a red block R, a green block G, a blue block B and a white block W having light-emitting particles therein/thereon. With reference to FIGS. 5A-5C, the red block R, the green block G, the blue block B, and the white block W having light-emitting particles therein/thereon may have the same size but may also have different sizes, for example, each blue block region B and each white block region W may be smaller than red block region R and green block region G.

In the embodiments of the disclosure, it may be understood that a pixel matrix including a plurality of pixel units may be formed by reasonably arranging the red block R, the green block G, the blue block B and the white block W having light-emitting particles therein/thereon. As shown in FIG. 5A, the red block R, the green block G, the blue block B and the white block W having light-emitting particles therein/thereon may be periodically arranged in sequence. Each pixel unit comprises one red block R, one green block G, one blue block B and one white block W. As shown in FIG. 5B, each pixel unit comprises a 2×3 sub-pixel matrix composed of red block R, green block G, a blue block B and a white block W, and the quantity of the blue block B and the white block W is half of the quantity of the red block R and the green block G. The block are arranged in the order of red block, blue block, and green block in the first row of the sub-pixel matrix, and in the order of green block, white block and red block in the second row. As shown in FIG. 5C, each pixel unit comprises a 2×2 sub-pixel matrix composed of a red block R, a green block G, a blue block B and a white block W. The red block and the green block are arranged in the first row of the sub-pixel matrix, and the blue block and the white block are arranged in the second row of the sub-pixel matrix.

It should be understood that the arrangement of the red block R, the green block G, the blue block B and the white block W shown in FIGS. 5A-5B is also applicable to the other embodiments described herein, and will not be repeated in other embodiments. In addition, the arrangement of the red block R, the green block G, the blue block B and the white block W is not exhaustively listed herein, and other arrangements may also be included.

For a conventional color film substrate based on RGB primary colors, assuming that the area of each block is ⅓ of the total area of a pixel unit and the transmittance of each block to the light incident thereon is ⅓, the total transmittance of the pixel unit is then ⅓*⅓+⅓*⅓+⅓*⅓=⅓ ≈33.3%.

In the embodiments of the disclosure, in the case where the quantities of the red block R, the green block G, the blue block B and the white block W are equal, and assuming that the area of each block is ¼ of the total area of a pixel unit, the transmittance of the white block to the light incident thereon is 1 and the transmittance of the other type of block to the light incident thereon is ⅓, the total transmittance of the pixel unit is then ¼*⅓+¼*⅓+¼*⅓+¼*1=½=50%. As a result, transmittance is increased to about 1.5 times, as compared with a conventional RGB three-color film substrate. On the other hand, as described above, the light-emitting particles, which may emit yellow light upon the excitation of the incident light, are dispersed in the white block, thereby increasing the yellow light component on the basis of the RGBW four-color display, thus the multi-color display with high transmittance and a wide color gamut range may be realized.

In the embodiments described herein, there is further provided a display device, which has high transmittance and a wide color gamut range and therefore may be applied to both situations requiring high transmittance and low power consumption and situations requiring good color rendering.

An exemplary display device provided by the embodiments of the disclosure will now be described in detail with reference to FIG. 6.

Figure 6:
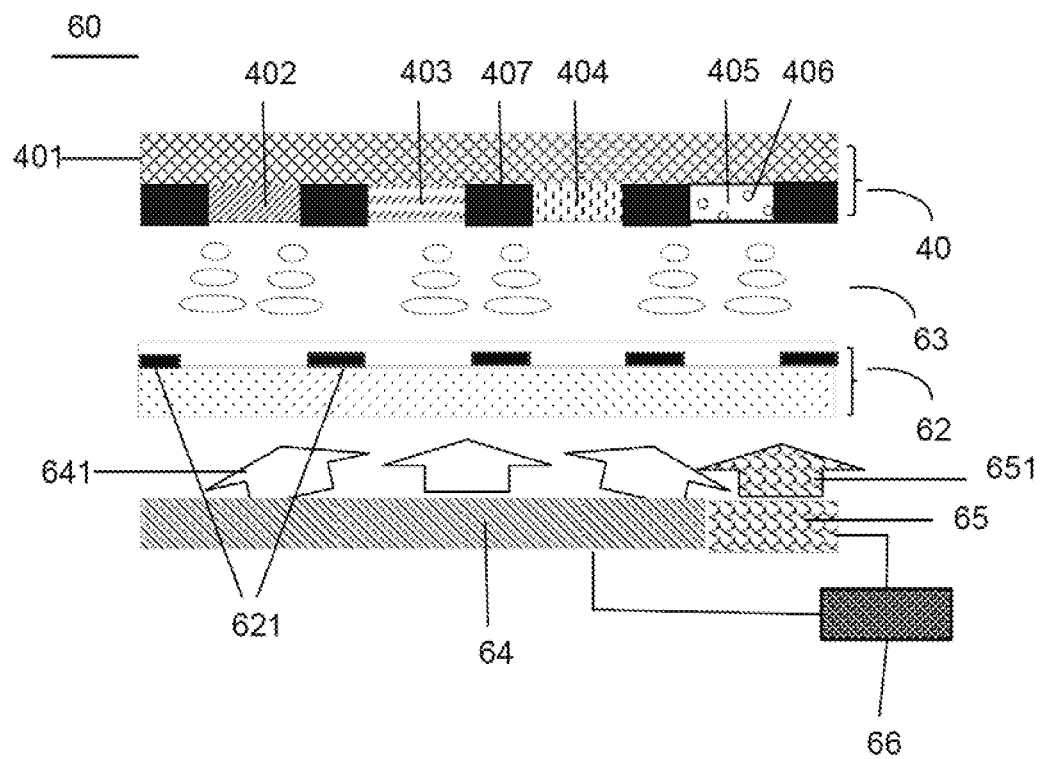
FIG. 6 schematically shows a cross-sectional view of an exemplary display device according to an embodiment of the disclosure.

FIG. 6 schematically shows a cross-sectional view of an exemplary display device 60 according to an embodiment of the disclosure. As shown in FIG. 6, the display device 60 may comprise a color film substrate 40 in the embodiment shown in FIG. 4, an array substrate 62 positioned opposite to the color film substrate 40, a liquid crystal layer 63 positioned between the color film substrate 40 and the array substrate 62, and a first backlight unit 64 and a second backlight unit 65 positioned on a side of the array substrate 62 far away from the liquid crystal layer 63.

In this embodiment, the color film substrate 40 may comprise a red block 402, a green block 403, a blue block 404 and a white block 405 on a substrate 401, wherein the white block 405 are provided with light-emitting particles 406 dispersed therein or on the surface thereof and capable of emitting yellow light upon the excitation of incident light 651. Alternatively, the light-emitting particles 406 may be up-converting light-emitting particles, for example, holmium ytterbium co-doped $Gd_2Mo_3O_9$ phosphor particles. Of course, other embodiments for light-emitting particles capable of emitting yellow upon the excitation of light at a specific wavelength are also possible.

As already described herein, the color film substrate 40 may further comprise a black matrix formed on the substrate in a matrix arrangement and defining pixel regions, and a common electrode formed of a transparent material such as indium tin oxide (ITO) or indium zinc oxide (IZO).

In this embodiment, the first backlight unit 64 may be configured to emit white light 641, the red component, the green component and the blue component in which may pass through the red block 402, the green block 403, the blue block 404 and the white block 405 respectively. Specifically, red light, green light, blue light and white light may emerge from the red block 402, the green block 403, the blue block 404 and the white block 405 respectively after the white light emitted by the first backlight unit 64 passing through the array substrate 62, the liquid crystal layer 63 and the color film substrate 61. Alternatively, the first backlight unit 64 may comprise a blue LED and yttrium aluminum garnet (YAG) powder coated on the blue LED.

In this embodiment, the second backlight unit 65 may be configured to emit the incident light that may excite the light-emitting particles to emit yellow light. In an exemplary embodiment, the position of the second backlight unit 65 corresponds to the position of the white block so that light emitted by the second backlight unit 65 excites the light-emitting particles in the white block to emit yellow light. As described above, the light emitting particles may be holmium ytterbium co-doped $Gd_2Mo_3O_9$ phosphor particles, in which case the second backlight unit 65 may be a near-infrared laser LED that may emit near-infrared light in a wavelength range of about 900 nm to about 1100 nm. More specifically, the second backlight unit 65 may be a laser LED that may emit light having a wavelength of about 980 nm.

In this embodiment, the array substrate 62 may comprise a plurality of thin film transistors (TFTs) 621 formed on the substrate, which are not described in detail herein, and a plurality of pixel electrodes electrically connected to the thin film transistors and formed of a transparent conductive material such as ITO and IZO.

It should be understood that the display device 60 may further comprise a first polarizer and a second polarizer respectively positioned on the color film substrate 40 and the array substrate 62.

In the embodiment where the display device includes the white block having light-emitting particles therein/thereon in addition to the RGB block, the light-emitting particles may emit yellow light upon the excitation of incident light emitted by the second backlight unit, so that on the one hand, the white light may pass through the white block to realize the RGBW display, and on the other hand, the light-emitting particles may emit yellow light upon the excitation of the light emitted by the second backlight unit to realize the RGBY display. Therefore, the display device of the embodiments of the disclosure may realize both the RGBW display with high transmittance and low power consumption and the RGBY display with a wide color gamut range and good color rendering.

Referring again to FIG. 6, in one embodiment, the display device 60 may further comprise a control unit 66 electrically connected (directly or indirectly) to the first backlight unit 64 and the second backlight unit 65. The control unit 66 is configured to control the display device to switch between the first operation mode and the second operation mode. Specifically, in the first operation mode, the control unit 66 controls both the first backlight unit 64 and the second backlight unit 65 to be turned on; in the second operation mode, the control unit 66 controls the first backlight unit 64 to be turned on and controls the second backlight unit 65 to be turned off.

In this configuration, the display device may be adapted to different application situations by controlling it to switch between two operation modes by means of the control unit 66. Specifically, in situations requiring high transmittance and low power consumption, the control unit 66 may control the first backlight unit 64 to be turned on and control the second backlight unit 65 to be turned off. In this case, the first backlight unit 64 emits white light 641, the red component, the green component and the blue component of which may pass through the red block, green block and blue block respectively, and the white light 641 emitted by the first backlight unit 64 may pass through the white block, so that the display device 60 may operate in the second operation mode (i.e., the RGBW mode). In situations requiring high color rendering, the control unit 66 may control both the first backlight unit 64 and the second backlight unit 65 to be turned on. In this case, the first backlight unit 64 emits white light 641, and the light (for example, near-infrared light of about 980 nm) 651 emitted by the second backlight unit 65 excites the light-emitting particles in the white block to emit yellow light, such that the display device 60 may operate in the first operation mode (i.e., the RGBW+RGBY mode), to achieve low power consumption and good color rendering.

It should be noted that the units or modules (for example, the control unit 66) described herein may be implemented as a combination of a processor and a memory, wherein the processor executes the program stored in the memory so as to implement the functions of the respective units or modules. The units or modules described herein may also be implemented in complete hardware implementations, including application specific integrated circuits (ASICs), field programmable gate arrays (FPGAs), and the like.

In the embodiments described herein, there is further provided an array substrate, which may be applied in the display device, such that the display device has high transmittance and a wide color gamut range and thus may be applied both in situations requiring high transmittance and low power consumption and in situations requiring good color rendering.

An exemplary array substrate provided in the embodiments of the disclosure will now be described in detail with reference to FIG. 7.

Figure 7:
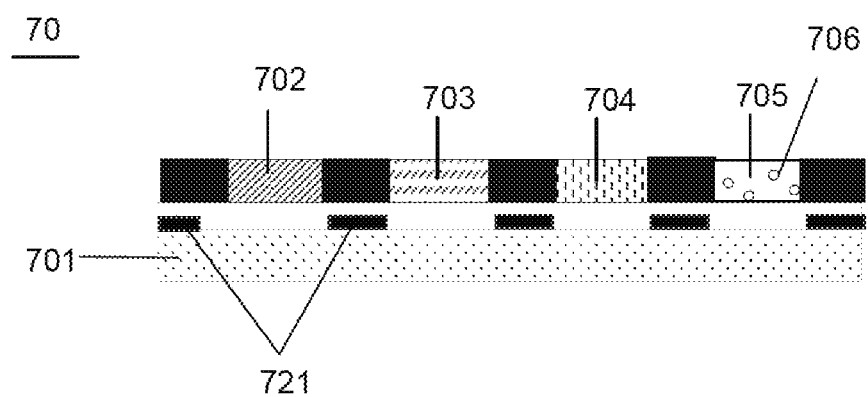
FIG. 7 schematically shows a cross-sectional view of an exemplary array substrate according to an embodiment of the disclosure.

FIG. 7 schematically shows a cross-sectional view of an exemplary array substrate 70 according to an embodiment of the disclosure. As shown in FIG. 7, the array substrate may comprise a substrate 701, thin film transistors (TFTs) 721 on the substrate 701 arranged in an array, and a red block 702, a green block 703, a blue block 704 and a white block 705 on the substrate. In this embodiment, the white block 705 is provided with light-emitting particles 706 dispersed therein or on the surface thereof, the light-emitting particles 706 being capable of emitting yellow light upon the excitation of the incident light. The white block 705 may allow white light to pass through, the red block 702 may allow the red light component in white light to pass through and block the light with the other colors, and the green block 703 may allow the green light component in white light to pass through and block the light with the other colors, and the blue block 704 may allow the blue light component in white light to pass through and block the light with the other colors.

The substrate 701, the red block 702, the green block 703, the blue block 704, the white block 705, and the light-emitting particles 706 in the embodiment shown in FIG. 7 may have the same material and the same functions as those shown in the embodiment shown in FIG. 4, and therefore, the detailed explanations of these components and their arrangement in the embodiment shown in FIG. 4 are also applicable to the embodiment shown in FIG. 7, the description of which will not be repeated in this embodiment.

It may be understood that the array substrate 70 may further comprise, in addition to the components shown in FIG. 7, other conventional components required in operation, for example, a plurality of pixel electrodes electrically connected to the thin film transistors and formed of a transparent conductive material such as ITO and IZO, and a polarizer on the substrate. As these conventional components do not relate to the main idea of the disclosure, they are not described in detail herein, but this does not mean that the array substrate described herein necessarily does not have these components.

In the array substrate provided in this embodiment, by adding the white block containing light-emitting particles (for example, holmium ytterbium co-doped $Gd_2Mo_3O_9$ phosphor particles) on the basis of the RGB block, on the one hand, white light may pass through the white block to realize the displaying in the RGBW mode, and on the other hand, the light-emitting particles may emit yellow light upon the excitation of incident light at a specific wavelength (for example, about 980 nm) to realize the RGBY displaying. Therefore, in the case where the array substrate provided in the embodiments of the disclosure is applied to a display device, both the RGBW display with high transmittance and low power consumption and the RGBY display with a wide color gamut range and good color rendering may be realized simultaneously, under the cooperation of a backlight unit capable of emitting white light and a backlight unit capable of emitting the incident light. That is, both the display color and the display luminance of the display device may be improved.

In the embodiments described herein, there is further provided another display device, which has high transmittance and a wide color gamut range. Therefore, such display device may be applied not only to situations requiring high transmittance and low power consumption, but also to situations requiring good color rendering.

Figure 8:
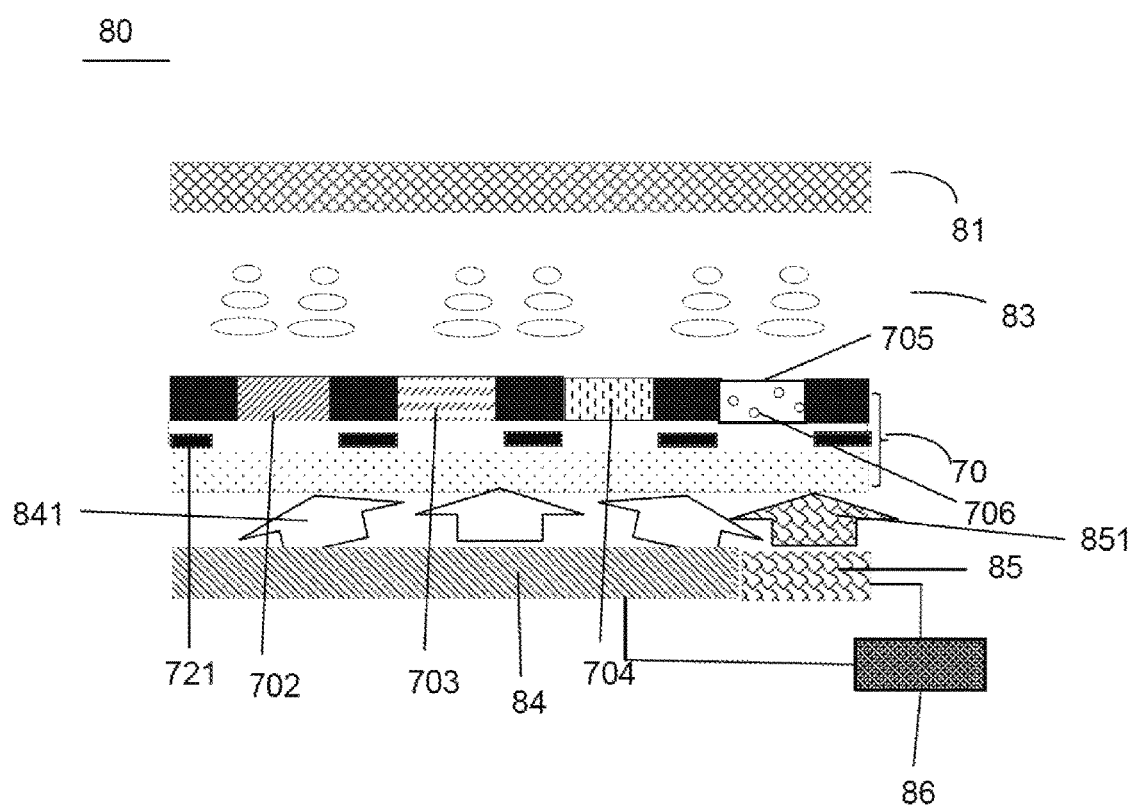
FIG. 8 schematically shows a cross-sectional view of another exemplary display device according to an embodiment of the disclosure.

Referring now to FIG. 8, another exemplary display device provided by the embodiment of the disclosure will be described in detail.

FIG. 8 schematically shows a cross-sectional view of another exemplary display device 80 according to an embodiment of the disclosure. As shown in FIG. 8, the display device 80 may comprise the array substrate 70 in the embodiment shown in FIG. 7, a opposite substrate 81 positioned opposite to the array substrate, a liquid crystal layer 83 positioned between the opposite substrate 81 and the array substrate 70, and a first backlight unit 84 and a second backlight unit 85 positioned on a side of the array substrate 70 far away from the liquid crystal layer.

In this embodiment, the display device 80 may further comprise a control unit 86 electrically connected (directly or indirectly) to the first backlight unit 84 and the second backlight unit 85 and configured to control the display device to switch between the first operation mode (RGBW+RGBY mode) and the second operation mode (RGBW mode).

The display device 80 provided by this embodiment differs from the display device 60 shown in FIG. 6 in that in the embodiment shown in FIG. 6, the red block 402, the green block 403, the blue block 404 and the white light 404 are located on the color film substrate 40, while in this embodiment, the red block 702, the green block 703, the blue block 704 and the white block 705 are located on the array substrate 70. Other than this, the other components and configurations are substantially the same as the embodiment shown in FIG. 6, and thus the detailed explanations of the respective components in the embodiment shown in FIG. 6 are also applicable to the embodiment, and will not be repeated herein.

Similar to the embodiment shown in FIG. 6, in the embodiment where the display device includes the white block having light-emitting particles therein/thereon in addition to the RGB block, the light-emitting particles may emit yellow light upon the excitation of the incident light emitted by the second backlight unit 85, so that on the one hand the white light 841 may pass through the white block to realize the RGBW display, and on the other hand, the light-emitting particles may emit yellow light upon the excitation of the light 851 emitted by the second backlight unit 85 to realize the RGBY display. Therefore, the display device of the embodiment of the disclosure may realize both the RGBW display with high transmittance and low power consumption and the RGBY display with a wide color gamut range and good color rendering.

In addition, the display device may be adapted to different application situations by controlling it to switch between the two operation modes by means of the control unit 86. Specifically, in situations requiring high transmittance and low power consumption, the control unit 86 may control the first backlight unit 84 to be turned on and control the second backlight unit 85 to be turned off so that the display device may operate in the second operation mode (i.e., the RGBW mode); in situations requiring high color rendering, the control unit 86 may control both the first backlight unit 84 and the second backlight unit 85 to be turned on, so that the display device may operate in the first operation mode (i.e., the RGBW+RGBY mode).

In still another embodiment of the disclosure, there is further provided a method for controlling a display device described herein. The method may comprise controlling the display device to switch between a first operation mode and a second operation mode, wherein in the first operation mode, both the first backlight unit and the second backlight unit are turned on; in the second operation mode, the first backlight unit is turned on and the second backlight unit is turned off. The control method may enable the display device to be applicable to different application situations. Specifically, in situations requiring high transmittance and low power consumption, the display device operates in the second operation mode (i.e., the RGBW mode) so as to improve light transmittance; in situations requiring high color rendering, the display device operates in the first operation mode (i.e., the RGBW+RGBY mode) so as to improve both the light transmittance and the color gamut range of the displayed color.

The foregoing description of the embodiment has been provided for purpose of illustration and description. It is not intended to be exhaustive or to limit the application. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the application, and all such modifications are included within the scope of the application.

What is claimed is:

1. A display device, comprising:
    a color film substrate including a substrate, and a red block, a green block, a blue block and a white block positioned on the substrate;
    an array substrate positioned opposite to the color film substrate;
    a liquid crystal layer positioned between the color film substrate and the array substrate;
    a first backlight unit and a second backlight unit positioned on a side of the array substrate away from the liquid crystal layer; and
    a control unit connected to the first backlight unit and the second backlight unit;
    wherein the white block includes light-emitting particles dispersed therein or on the surface thereof, the light-emitting particles capable of emitting yellow light upon the excitation of incident light;
    wherein the light-emitting particles comprise holmium ytterbium co-doped $Gd_2Mo_3O_9$ phosphor particles, and wherein a wavelength of the incident light ranges from about 900 nm to about 1100 nm;
    wherein the first backlight unit is configured to emit white light, and the second backlight unit is configured to emit the incident light that excites the light-emitting particles to emit yellow light; and
    wherein the control unit is configured to control the display device to switch between a first operation mode and a second operation mode, in the first operation mode the control unit is configured to control both the first backlight unit and the second backlight unit to turn on, and in the second operation mode the control unit is configured to control the first backlight unit to turn on and to control the second backlight unit to turn off.

2. The display device according to claim 1, wherein the wavelength of the incident light is about 980 nm.

3. The display device according to claim 1, wherein the white block comprises about 5-8% by weight of a resin; about 5-8% by weight of a multifunctional monomer; about 0.2-0.6% by weight of a photoinitiator; about 3-5% by weight of a dispersant; about 70-80% by weight of a solvent; and about 0.1-0.2% by weight of an additive, and a proportion of the light-emitting particles in the white block is about 5-20% by weight.

4. The display device according to claim 1, wherein the second backlight unit comprises a laser LED capable of emitting light in a wavelength range of about 900 nm to about 1100 nm.

5. The display device according to claim 1, wherein the first backlight unit comprises a blue LED and YAG powder coated on the blue LED.

6. A method for controlling the display device according to claim 1, the method comprising:
    controlling the display device to switch between the first operation mode and the second operation mode, wherein in the first operation mode both the first backlight unit and the second backlight unit are turned on, and in the second operation mode the first backlight unit is turned on and the second backlight unit is turned off.

7. The method according to claim 6, wherein the second backlight unit comprises a laser LED capable of emitting light in a wavelength range of about 900 nm to about 1100 nm.

8. A display device comprising:
    an array substrate including a substrate, thin film transistors arranged in an array on the substrate, and a red block, a green block, a blue block and a white block positioned on the substrate;
    an opposite substrate positioned opposite to the array substrate;
    a liquid crystal layer positioned between the opposite substrate and the array substrate;
    a first backlight unit and a second backlight unit positioned on a side of the array substrate away from the liquid crystal layer; and
    a control unit connected to the first backlight unit and the second backlight unit;

wherein the white block includes light-emitting particles dispersed therein or on the surface thereof, the light-emitting particles capable of emitting yellow light upon the excitation of incident light;

wherein the light-emitting particles comprise holmium ytterbium co-doped Gd2Mo3O9 phosphor particles, and wherein a wavelength of the incident light ranges from about 900 nm to about 1100 nm;

wherein the first backlight unit is configured to emit white light, and the second backlight unit is configured to emit the incident light that excites the light-emitting particles to emit yellow light; and wherein the control unit is configured to control the display device to switch between a first operation mode and a second operation mode, in the first operation mode the control unit is configured to control both the first backlight unit and the second backlight unit to turn on, and in the second operation mode the control unit is configured to control the first backlight unit to turn on and to control the second backlight unit to turn off.

9. The display device according to claim 8, wherein the wavelength of the incident light is about 980 nm.

10. The display device according to claim 8, wherein, the white block comprises about 5-8% by weight of a resin; about 5-8% by weight of a multifunctional monomer; about 0.2-0.6% by weight of a photoinitiator; about 3-5% by weight of a dispersant; about 70-80% by weight of a solvent; and about 0.1-0.2% by weight of an additive, and a proportion of the light-emitting particles in the white block is about 5-20% by weight.

11. The display device according to claim 8, wherein the second backlight unit comprises a laser LED capable of emitting light in a wavelength range of about 900 nm to about 1100 nm.

12. The display device according to claim 8, wherein the first backlight unit comprises a blue LED and YAG powder coated on the blue LED.

13. A method for controlling the display device according to claim 8, the method comprising:

controlling the display device to switch between the first operation mode and the second operation mode, wherein in the first operation mode both the first backlight unit and the second backlight unit are turned on, and in the second operation mode the first backlight unit is turned on and the second backlight unit is turned off.

14. The method according to claim 13, the second backlight unit comprises a laser LED capable of emitting light in a wavelength range of about 900 nm to about 1100 nm.

* * * * *